US009287547B2

(12) United States Patent
Widhalm

(10) Patent No.: US 9,287,547 B2
(45) Date of Patent: Mar. 15, 2016

(54) MATERIAL AND COATING FOR INTERCONNECTOR BUSBARS

(71) Applicant: Ford Global Technologies, LLC, Dearborn, MI (US)

(72) Inventor: Humi Widhalm, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/251,939

(22) Filed: Apr. 14, 2014

(65) Prior Publication Data

US 2014/0215819 A1 Aug. 7, 2014

Related U.S. Application Data

(63) Continuation of application No. 13/353,859, filed on Jan. 19, 2012, now abandoned.

(51) Int. Cl.
| | |
|---|---|
| *H01R 13/405* | (2006.01) |
| *H01M 2/20* | (2006.01) |
| *H01M 2/22* | (2006.01) |
| *H01B 1/02* | (2006.01) |
| *C25D 5/34* | (2006.01) |
| *C25D 7/00* | (2006.01) |
| *H01M 2/26* | (2006.01) |
| *H01M 4/66* | (2006.01) |
| *C25D 3/12* | (2006.01) |

(52) U.S. Cl.
CPC ............... *H01M 2/206* (2013.01); *C25D 5/34* (2013.01); *C25D 7/00* (2013.01); *H01B 1/026* (2013.01); *H01M 2/202* (2013.01); *H01M 2/204* (2013.01); *H01M 2/22* (2013.01); *H01M 2/266* (2013.01); *H01M 4/661* (2013.01); *C25D 3/12* (2013.01); *Y10T 29/49224* (2015.01)

(58) Field of Classification Search
USPC .............. 439/736, 874; 29/623.3, 623.2, 863, 29/884–886, 858; 429/94, 194, 210, 121
See application file for complete search history.

(56) References Cited

U.S. PATENT DOCUMENTS

| | | | |
|---|---|---|---|
| 2,805,986 A * | 9/1957 | Law | ............................. 204/281 |
| 3,240,684 A | 3/1966 | Martin et al. | |
| 3,355,268 A | 11/1967 | Rose et al. | |
| 3,921,886 A | 11/1975 | Ford et al. | |
| 4,620,661 A | 11/1986 | Slatterly | |
| 5,326,412 A | 7/1994 | Schreiber et al. | |
| 5,804,022 A | 9/1998 | Kaltenbach et al. | |
| 6,162,365 A * | 12/2000 | Bhatt et al. | ........................ 216/13 |
| 6,468,672 B1 | 10/2002 | Donovan, III et al. | |
| 7,002,447 B2 * | 2/2006 | Dedert et al. | ................. 338/190 |
| 7,321,172 B2 | 1/2008 | Wood et al. | |
| 7,396,703 B1 * | 7/2008 | Lin et al. | ........................ 438/118 |
| 8,431,456 B2 * | 4/2013 | Alapati et al. | ................. 438/257 |
| 2005/0022747 A1 | 2/2005 | Stanbery | |
| 2007/0111089 A1 | 5/2007 | Swan | |
| 2008/0187472 A1 | 8/2008 | Ahn et al. | |
| 2008/0188071 A1 | 8/2008 | Lee et al. | |

(Continued)

FOREIGN PATENT DOCUMENTS

EP 1054461 A2 11/2000

*Primary Examiner* — Jean F Duverne
(74) *Attorney, Agent, or Firm* — David B. Kelley; Brooks Kushman P.C.

(57) ABSTRACT

In one embodiment, an electrochemical system includes an interconnector busbar including a substrate and a coating contacting the substrate, the coating including a layer of electroplated elemental nickel.

17 Claims, 2 Drawing Sheets

(56) References Cited

U.S. PATENT DOCUMENTS

| | | | |
|---|---|---|---|
| 2010/0188799 A1 * | 7/2010 | Galvagni et al. ........... 361/306.3 |
| 2010/0201477 A1 | 8/2010 | Yang et al. |
| 2010/0248010 A1 | 9/2010 | Butt et al. |
| 2011/0277963 A1 | 11/2011 | Chiou et al. |

* cited by examiner

MATERIAL AND COATING FOR INTERCONNECTOR BUSBARS

CROSS-REFERENCE TO RELATED APPLICATION

This application is a continuation of U.S. patent application No. 13/353,859 filed on Jan. 19, 2012, the disclosure of which is incorporated in its entirety by reference herein.

TECHNICAL FIELD

One or more embodiments of the present invention relate to material and coating for interconnector busbars.

BACKGROUND

In electric vehicles (EVs), high-voltage (HV) battery pack(s) consist of interconnected battery modules. Each battery module contains a number of battery cells interconnected electrically via the joints between battery cell terminals and interconnector busbars. As depicted in FIGS. 1A and 1B, when laminated pouch cells are used, the interconnector busbars are typically joined onto a Printed Circuit Board (PCB) to form an Interconnector Board (ICB).

SUMMARY

In one embodiment, an interconnector busbar includes a substrate and a coating contacting the substrate, wherein the substrate includes a soft-annealed high purity copper and the coating includes an electroplating of nickel on the substrate.

In certain particular instances, the substrate includes a copper sheet of C11000-HO60 according to ASTM B152/B152M, having a thickness of 800+/−20 micrometers or thinner values, and a roughness Ra of 0.15 micrometer with an upper limit of 0.3 micrometer in coil transversal direction.

In certain particular instances, the nickel electroplating includes type 1 of ASTM B689, with matte finish but without hardener and brightener, and having a thickness of 1.0+/−0.5 micrometers corresponding to ASTM B689 Class X.

In certain other instances, the coating includes both pre-plating from a batch or continuous plating process on a sheet or coil/reel of interconnector busbar substrate material prior to forming it into interconnector busbars, and post-plating from a batch or continuous plating process on formed interconnector busbars prior to joining them onto an ICB.

In another embodiment, the nickel-electroplated and formed busbars are joined onto an ICB, wherein the busbars shall have an equivalent particle contaminant of less than ISO 14644-1, Class 8. In certain other instances, the busbars shall have an equivalent organic contaminant of less than 15 milligrams per square meters.

In yet another embodiment, ICBs shall conform to IPC-6012B, Section 3.9, wherein the contamination level on the ICBs shall be less than an equivalent of 1.56 micrograms per square centimeters of sodium chloride for both uncoated and finished printed boards.

In yet another embodiment, each interconnector busbar includes one or more U-channel(s), wherein each U-channel has two walls bent upwards from the base with a wall opening angle of less than 1 degree in all directions. In certain other instances, the interconnector busbars and their U-channels have an angle of less than 1 degree in all three dimensions.

In one embodiment, an electrochemical system includes an interconnector bus bar including a substrate and a coating contacting the substrate, the coating including neat metal nickel. The coating may have a thickness of no greater than 5 micrometers or of between 0.5 to 1.5 micrometers in certain instances.

It is desirable that the coating does not include any phosphate. When unintentionally and/or accidentally included, phosphate is included in the coating at less than 5, 4, 3, 2, 1, 0.5 or 0.1 weight percent, nickel phosphate NiP is included in the coating at less than 5, 4, 3, 2, 1, 0.5 or 0.1 weight percent, nickel phosphate $Ni_3P$ is included in the coating at less than 5, 4, 3, 2, 1, 0.5 or 0.1 weight percent.

In certain other instances, the substrate includes an electroconductive sheet metal such as a soft-annealed copper material in particular. In certain particular instances, the substrate includes a copper sheet metal meeting the standard of C11000-HO60 according to ASTM B152/B152M.

In certain other instances, the busbar includes a wall portion and a base portion, the wall portion extending from the base portion with an angle of between 65 to 115 degrees, the coating contacting the wall portion of the busbar.

In another aspect, a method of forming an electrochemical system includes forming an interconnector busbar, the interconnector busbar including a substrate and a coating contacting the substrate, the coating including a neat metal nickel. In certain instances, the coating of the interconnector busbar is electroplated. The substrate may be provided to include a copper sheet metal C11000-HO60 according to ASTM B152/B152M. In certain other instances, the method further includes applying the coating onto a copper sheet metal as the substrate to form a coated copper sheet metal and forming the coated copper sheet metal to form the interconnector busbar. In certain other instances, the method further includes blanking the coated copper sheet metal prior to forming the interconnector busbar.

DETAILED DESCRIPTION

As required, detailed embodiments of the present invention are disclosed herein. However, it is to be understood that the disclosed embodiments are merely exemplary of the invention that may be embodied in various and alternative forms. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Also, unless expressly stated to the contrary, the description of a group or class of material is suitable or preferred for a given purpose in connection with the invention implies that mixtures of any two or more members of the group or class may be equally suitable or preferred.

Figure 1B:
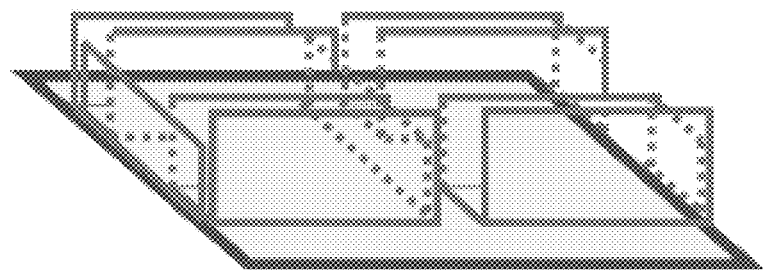
FIG. 1B depicts an ICB assembly including a printed circuit board and interconnector busbars.
Figure 1A:
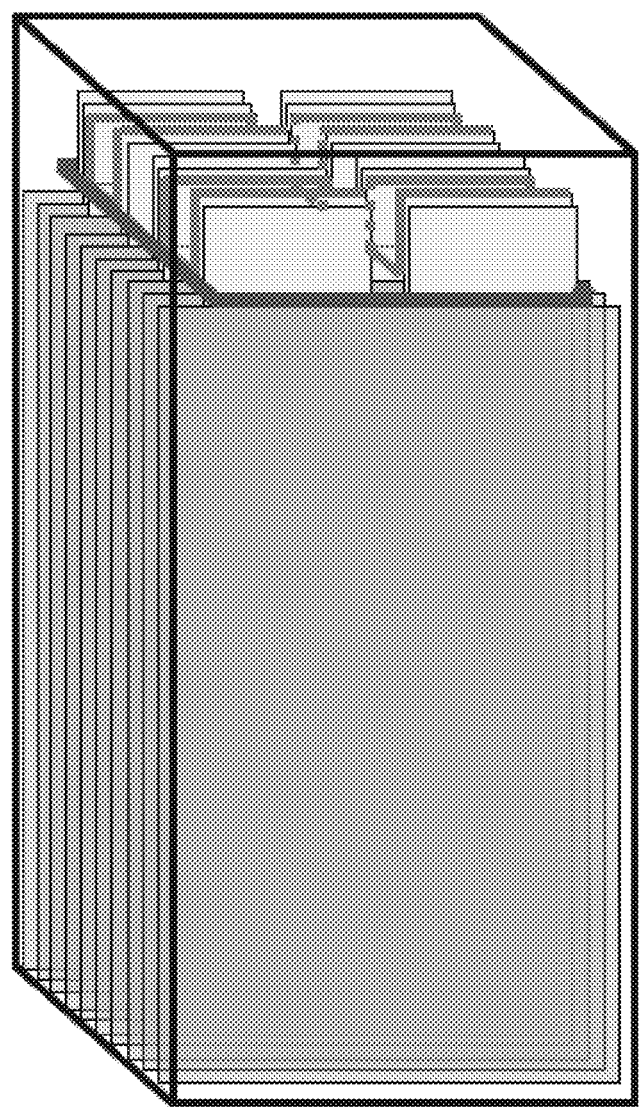
FIG. 1A depicts a battery cell stack including a number of battery cells with battery cell terminals, an ICB, and interconnector busbars, in a battery module.

In electric vehicles (EVs), high-voltage (HV) battery pack(s) consist of battery modules which are interconnected electrically and thermally. Each battery module contains a number of battery cells and cooling plates or fins that are stacked in a structural framework (FIG. 1A), and interconnected electrically by joining the battery cell terminals to interconnector busbars and thermally by coolant distribution manifold(s). When laminated pouch cells are used, the interconnector busbars are typically joined mechanically and metallurgically onto a Printed Circuit Board (PCB) (FIG. 1B). This PCB is termed Interconnector Board (ICB), and the busbars are referred to as ICB busbars.

Figure 2:
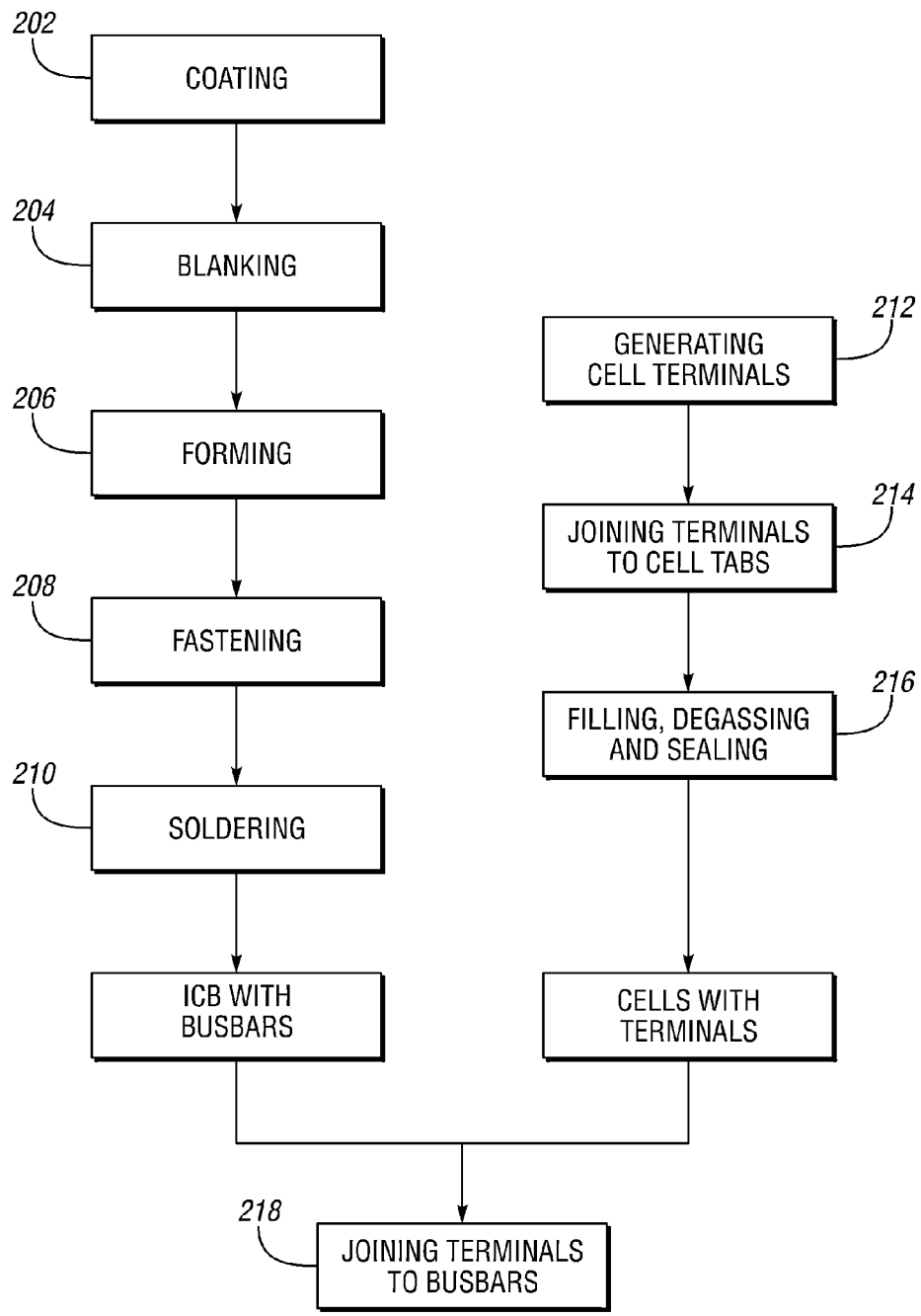
FIG. 2 depicts exemplary processes for generating electric interconnections in a battery module.

As shown schematically in FIG. 2, many processes are required for generating the electric interconnections in a battery module, including (1) manufacturing interconnector busbars and joining to ICBs, (2) producing battery cells with terminals, and (3) joining battery cell terminals to ICB busbars.

In an exemplary manufacturing process for interconnector busbars and ICB assembly, a sheet metal is coated (#202), blanked (#204) and formed (#206) into a busbar with one or more U-channels, where each U-channel has two walls bent upwards from the base. In a prog-die process, blanking may be omitted, and busbars are formed and trimmed off during continuous coil feeding. The busbars are then joined to an ICB using mechanical fastening and metallurgical joining such as riveting (#208) and soldering (#210).

In an exemplary manufacturing process for battery cells, battery cell terminals are generated (#212) and joined to battery cell tabs (#214). After electrolyte filling and degassing, battery cell pouch is sealed (#216), where the battery cell terminals are partially sealed in the pouch with about 60% exposed outside the pouch, ready for joining to the ICB busbars.

In an exemplary manufacturing process for electric interconnections in a battery module, two or more battery cell terminals are grouped together and joined to an ICB busbar (#218). The joining process is repeated until all groups of the battery cell terminals and remaining ICB busbars are joined. This completes the assembly of one battery module with the required electric interconnections.

To join ICB busbars to an ICB using mechanical fastening along with soldering for mechanical robustness and electric interconnections, the ICB busbar material needs to be soft enough for mechanical fastening and to maintain adequate solderability for reliable soldering to the ICB. However, the ICB busbar materials used in early generation of EVs are hard with less formability. This makes the busbar forming, fastening and joining processes challenging. Harder sheet metals usually generate more springback than softer sheet metals, causing more dimensional instability in forming, and pop-open in fastening and joining. Harder sheet metals also demand higher forces or energies to form, clamp and join. For a given energy input, harder sheet metals generate lower joint strength and higher interfacial resistance.

The Electroless Nickel (EN) plating (NiP, $Ni_3P$) on the busbar substrate materials used in early generation of EVs is hard with low formability, low electrical and thermal conductivities, and poor solderability. In general, electroless process employs the use of certain chemical reactions and does not involve the use of electrical current. Consequently, forming and fastening tools and dies wear out quickly, and high forces or energies are often needed to form and fasten the ICB busbars. Soldering the ICB busbars onto the ICB for electric interconnections becomes challenging due to the poor solderability of the EN plating, demanding aggressive flux to activate the surfaces to be soldered. The low electrical conductivity of the EN plating causes more interfacial resistance and power loss across the ICB and heat buildup on the ICB busbars during service. The low thermal conductivity of the EN plating leads to more heat buildup around the joints and on the ICB busbars during service.

A new material and coating are highly desirable for the ICB busbars which offer the required formability, solderability and weldability with adequate electrical conductivity, sufficient corrosion resistance and wide availability, as well as lower cost.

In one or more embodiments, the present invention provides a new material and coating solution for optimal manufacturability of the ICB busbars and battery modules in HV battery packs.

In one embodiment, the present invention provides an ICB busbar including a substrate and a coating contacting the substrate, wherein the substrate includes a soft-annealed high purity copper and the coating includes an electroplating of nickel on the substrate.

In certain particular instances, the substrate includes a copper sheet of C11000-HO60 according to ASTM B152/B152M, having a thickness of 800+/−20 micrometers or thinner values, and a roughness Ra of 0.15 micrometer with an upper limit of 0.3 micrometer in coil transversal direction.

In certain particular instances, the nickel electroplating includes type 1 of ASTM B689, with matte finish but without hardener and brightener, and having a thickness of 1.0+/−0.5 micrometers corresponding to ASTM B689 Class X.

In certain other instances, the coating includes both pre-plating from a batch or continuous plating process on a sheet or coil/reel of interconnector busbar substrate material prior to forming it into interconnector busbars, and post-plating from a batch or continuous plating process on formed interconnector busbars prior to joining them onto an ICB.

In another embodiment, the nickel-electroplated and formed busbars are joined onto an ICB, wherein the busbars shall have an equivalent particle contaminant of less than ISO 14644-1, Class 8. In certain other instances, the busbars shall have an equivalent organic contaminant of less than 15 milligrams per square meters.

In yet another embodiment, ICBs shall conform to IPC-6012B, Section 3.9, wherein the contamination level on the ICBs shall be less than an equivalent of 1.56 micrograms per square centimeters of sodium chloride for both uncoated and finished printed boards.

In yet another embodiment, each interconnector busbar includes one or more U-channel(s), wherein each U-channel has two walls bent upwards from the base with a wall opening angle of less than 1 degree in all directions. In certain other instances, the interconnector busbars and their U-channels have an angle of less than 1 degree in all three dimensions.

The new material and coating solution for ICB busbars according to one or more embodiments of the present invention overcomes the challenges encountered in the art. Some of the key advantages of the present invention are summarized in Table 1 detailed herein elsewhere, along with a comparison to the old materials used in early generation of EVs.

As shown in Table 1, compared to the old materials used in early generation of EVs, the present invention leads to about 10-times more conductivity in the coating, 2-times softer in the copper substrate, 6-times softer in the coating, 4-times more formable in the copper substrate and 10-times more formable in the coating. In addition, the material and coating in the present invention result in better solderability due to non-inclusion of phosphorus in the coating, less springback and superior weldability due to softness. IN contrast to electroless plating, electroplating employs the use of electrical current. Moreover, because electroplating is usually less costly and more available than electroless plating, the coating in one or more embodiments of the present invention may be produced with greater cost effectiveness relative to the old coating.

In yet another embodiment, the present invention provides an electrochemical system including an interconnector board busbar including a substrate and a coating contacting the substrate, the coating including electroplated nickel. In certain instances, the coating has a thickness of no greater than 5 micrometers. In certain particular instances, the coating has a thickness of between 0.5 to 1.5 micrometers.

In another embodiment, the electrochemical system further includes a number of battery cells each with a set of positive and negative terminals. The positive terminals may be formed of copper and the negative terminals may be formed of aluminum.

The electroplated nickel coating may be applied prior to the blanking or forming of the busbar substrate. In this connection, the busbar substrate may be in the form of rolled-up sheets of busbar substrate that has been pre-coated with the electroplated nickel coating. Alternatively, the busbar substrate may have already been cut or blanked in a configuration ready for subsequent forming step and then coated with the electroplated nickel coating, such that unnecessary waste due to the coating materials on the cut-out parts may be reduced. In addition, the electroplated nickel coating may also be applied after the busbar substrate has been cut and formed into a finished shape such as a "U" shape.

Referring back to FIG. 2, at step 212, a copper terminal may be ultrasonically welded to a battery cell pouch to form the positive terminal of a battery cell, and an aluminum terminal may be ultrasonically welded to the battery cell pouch to form the negative terminal. Battery cell terminals are plated or surface-treated. For example, copper terminals may be nickel plated and aluminum terminals may be surface-treated. At step 214, the plated or surface-treated battery cell terminals are joined to battery cell tabs, by for example riveting, laser welding or ultrasonic welding (USW), depending on many factors. At step 216, battery cell pouch is sealed after electrolyte fill and degas, where the battery cell terminals are partially sealed in the pouch with about 60% of which being positioned outside the pouch, ready for joining to the ICB busbar. At step 218, the terminals of the sealed cell pouch and the ICB are welded together via ultrasonic welding to form the electrochemical module. Battery cells with plated or surface-treated battery cell terminals are stacked in a structural framework. Depending on cooling strategy, i.e., bottom, side or face cooling, cooling plates may be assembled to bottom or side, or cooling fins may be stacked in-between the battery cells.

As shown schematically in FIG. 2, many processes are required for generating the electric interconnections in a battery module, including (1) manufacturing interconnector busbars and joining to ICBs, (2) producing battery cells with terminals, and (3) joining battery cell terminals to ICB busbars.

In an exemplary manufacturing process for interconnector busbars and ICB, a sheet metal is coated (#202), blanked (#204) and formed (#206) into a busbar with one or more U-channels, where each U-channel has two walls bent upwards from the base. In a prog-die process, blanking may be omitted, and busbars are formed and trimmed off during continuous coil feeding. The busbars are then joined to an ICB using mechanical fastening and metallurgical joining such as riveting (#208) and soldering (#210).

In an exemplary manufacturing process for battery cells, battery cell terminals are generated (#212) and joined to battery cell tabs (#214). After electrolyte filling and degassing, battery cell pouch is sealed (#216), where the battery cell terminals are partially sealed in the pouch with about 60% exposed outside the pouch, ready for joining to the ICB busbars.

In an exemplary manufacturing process for electric interconnections in a battery module, two or more battery cell terminals are grouped together and joined to an ICB busbar (#218). The joining process is repeated until all groups of the battery cell terminals and remaining ICB busbars are joined. This completes the assembly of one battery module with the required electric interconnections.

To join ICB busbars to an ICB using mechanical fastening along with soldering for mechanical robustness and electric interconnections, the ICB busbar material needs to be soft enough for mechanical fastening and to maintain adequate solderability for reliable soldering to the ICB. However, the ICB busbar materials used in early generation of EVs are hard with less formability. This makes the busbar forming, fastening and joining processes challenging. Harder sheet metals usually generate more springback than softer sheet metals, causing more dimensional instability in forming, and pop-open in fastening and joining. Harder sheet metals also demand higher forces or energies to form, clamp and join. For a given energy input, harder sheet metals generate lower joint strengths and higher interfacial resistances.

The Electroless Nickel (EN) platings (NiP, $Ni_3P$) on the busbar substrate materials used in early generation of EVs are hard with low formability, low electrical and thermal conductivities, and poor solderability. Consequently, forming and fastening tools and dies wear out quickly, and high forces or energies are often needed to form and fasten the ICB busbars. Soldering the ICB busbars onto the ICB for electric interconnections becomes challenging due to the poor solderability of the EN platings, demanding aggressive flux to activate the surfaces to be soldered. The low electrical conductivity of the EN platings causes more interfacial resistances and power losses across the ICB and heat buildup on the ICB busbars during service. The low thermal conductivity of the EN platings leads to more heat buildup around the joints and on the ICB busbars during service.

Therefore, a new material and coating are highly desirable for the ICB busbars which offer the required formability, solderability and weldability with adequate electrical conductivity, sufficient corrosion resistance and wide availability, as well as lower cost.

In one or more embodiments, the present invention provides a new material and coating for optimal manufacturability of the ICB busbars and battery modules in HV battery packs.

Two or more battery cell terminals may be grouped together to be received within an interconnector busbar. In certain designs, the battery cell terminals may need to be bent to different extents to better align with ICB busbars prior to stacking, depending on the battery cell thickness, the number of battery cell terminals in each group, and whether a cooling fin is stacked in between the battery cells. The ICB is brought to contact and aligned with the battery cell terminals. The ICB may be joined to the framework by a mechanical method or welding, depending on ICB and battery module designs.

Each group of the battery cell terminals and one of the ICB busbars are joined. The joining process is repeated until all groups of the battery cell terminals and remaining ICB busbars are joined. This completes the assembly of one battery module with the required electric interconnection. Depending on the ICB and battery module designs and the materials of the components in the battery module, one or few of the various joining methods may be applicable with different advantages and drawbacks.

The nickel electroplating as employed in one or more embodiments of the present invention differs from the electroless plating used in certain conventional constructions. For instance, the nickel electroplating applies a coating of nickel in neat metal without any significant amount of any other elements. In contrast, the electroless plating applies a coating of nickel phosphate with a significant amount of elements such as phosphate other than nickel.

Due to the chemistry difference between the nickel electroplating and nickel phosphate electroless plating, the resulting coating thickness may also vary. For instance, the thickness values of nickel phosphate coatings from the electroless plating are typically greater than 5 micrometers. In comparison, thickness values of nickel electroplating coatings can be smaller and sometimes substantially smaller than 5 micrometers. In certain instances, the thickness of the electroplated nickel coating of the busbars according to one or more embodiments of the present invention are in a range of 0.5 to 5 micrometers, 0.5 to 4.5 micrometers, 0.5 to 3.5 micrometers, 0.5 to 2.5 micrometers, or 0.5 to 1.5 micrometers.

As discussed herein, the electroplated nickel coating does not include a significant amount of any element other than nickel. To the extent that any phosphate is included incidentally and unintentionally, the electroplated nickel coating includes less than 5 percent, 4 percent, 3 percent, 2 percent, 1 percent, or 0.1 percent, by weight of phosphate. To the extent that any phosphate is included incidentally and unintentionally, the electroplated nickel coating includes less than 5 percent, 4 percent, 3 percent, 2 percent, 1 percent, or 0.1 percent, by weight of nickel phosphate in the chemical form of NiP. To the extent that any phosphate is included incidentally and unintentionally, the electroplated nickel coating includes less than 5 percent, 4 percent, 3 percent, 2 percent, 1 percent, or 0.1 percent, by weight of nickel phosphate in the chemical form of $Ni_3P$.

In certain instances, the inconnector board busbar includes a wall portion and a base portion, the wall portion extending from the base portion with an angle of between 65 to 115 degrees, the coating contacting the wall portion of the busbar. The angle may be of between 70 to 110 degrees, 75 to 105 degrees, 80 to 100 degrees, or 85 to 95 degrees. The wall portion may include four wall portion pieces together defining a rectangular "U" shape. The wall portion may include seven wall portion pieces together defining a double "U" shape.

In one embodiment, the present invention provides an ICB busbar including a substrate and a coating contacting the substrate, wherein the substrate includes a soft-annealed high purity copper and the coating includes a nickel electroplating on the substrate.

In certain instances, the substrate includes a copper sheet of C11000-HO60 according to ASTM B152/B152M, having a thickness of 800+/−20 micrometers or thinner values, and a roughness Ra of 0.15 micrometer with an upper limit of 0.3 micrometer in coil transversal direction.

In certain instances, the nickel electroplating includes type 1 of ASTM B689, with matte finish but without hardener and brightener, and having a thickness of 1.0+/−0.5 micrometers corresponding to ASTM B689 Class X.

In certain other instances, the coating includes both pre-plating from a batch or continuous plating process on a sheet or coil/reel of interconnector busbar substrate material prior to forming it into interconnector busbars, and post-plating from a batch or continuous plating process on formed interconnector busbars prior to joining them onto an ICB.

In another embodiment, the nickel-electroplated and formed busbars are joined onto an ICB, wherein the busbars have an equivalent particle contaminant of less than ISO 14644-1, Class 8, and an equivalent organic contaminant of less than 15 milligrams per square meters.

In yet another embodiment, ICBs conform to IPC-6012B, Section 3.9, wherein the contamination level on the ICBs is less than an equivalent of 1.56 micrograms per square centimeters of sodium chloride for both uncoated and finished printed boards.

In yet another embodiment, each interconnector busbar includes one or more U-channel(s), wherein each U-channel has two walls bent upwards from the base with a wall opening angle of less than 1 degree in all directions. In certain other instances, the interconnector busbars and their U-channels have an angle of less than 1 degree versus each of all three axes (x, y, z).

In certain instances, the busbar substrate includes an electro-conductive sheet metal. Non-limiting examples of the electro-conductive sheet metal include copper sheet metal and/or stainless steel sheet metal. The electro-conductive sheet metal may be a soft-annealed copper material, and in certain particular instances, a copper sheet metal meeting the standard of C11000-HO60 according to ASTM B152/B152M.

In yet another embodiment, the interconnector busbars are constructed to meet the industrial standard of IPC-6012B, Section 3.9. In certain instances, contamination level of the interconnector busbars is no greater than an equivalent of 1.56 micrograms per square centimeters of sodium chloride for both uncoated busbars and nickel electroplated busbars. In certain other instances, the nickel electroplated busbars have an equivalent particle contaminant of less than ISO 14644-1, Class 8. In yet certain other instances, the nickel electroplated busbars have an equivalent organic contaminant of less than 15 milligrams per square meters.

The new material and coating solution for ICB busbars according to one or more embodiments of the present invention overcomes the challenges encountered in the art, with some of the key advantages of one or more embodiments of the present invention summarized in Table 1.

TABLE 1

| Parameters | Comparative Busbar<br>C11000, HO2<br>800 µm<br>Electroless Ni-P Plating<br>ASTM B733<br>Type IV: 5%-9% P<br>SC1: 5-10 µm<br>Class 1: As-Deposited,<br>No HT | Sample Busbar<br>C11000, HO60<br>800 +/− 20 µm<br>Nickel Electroplating<br>ASTM B689, Matte<br>Type 1: No Hardener,<br>No Brightener<br>Class X: 1.0 +/− 0.5 µm | Detailed Comparison |
|---|---|---|---|
| Electrical Conductivity | 0 | 1 | Similar in base Cu,<br>~10-time more conductive in plating |

TABLE 1-continued

| Parameters | Comparative Busbar C11000, H02 800 μm Electroless Ni-P Plating ASTM B733 Type IV: 5%-9% P SC1: 5-10 μm Class 1: As-Deposited, No HT | Sample Busbar C11000, HO60 800 +/− 20 μm Nickel Electroplating ASTM B689, Matte Type 1: No Hardener, No Brightener Class X: 1.0 +/− 0.5 μm | Detailed Comparison |
|---|---|---|---|
| Hardness | 0 | 1 | 2-times softer in base Cu, >6-times softer in plating |
| Formability | 0 | 1 | 4-times more TE in base Cu, >10-times more TE in plating |
| Springback | 0 | 1 | Results of #2 |
| Solderability | 0 | 1 | Results of 0% P |
| Weldability | 0 | 1 | Results of #2-4 |
| Corrosion Resistance | 0 | 0 | Adequate |
| Cost | 0 | 1 | Electroplating usually less costly than Electroless plating |
| Availability | 0 | 1 | Electroplating usually more available than Electroless plating |
| Σ+ | 0 | 8 | Advantages |
| Σ− | 0 | 0 | Disadvantages |
| Σ0 | 0 | 1 | Similarities |
| Final Rank | 0 | 8 | Superior overall |

The comparative busbar has a copper substrate meeting C11000-H02, with a thickness of 800 micrometers, having an electroless plated nickel phosphate coating meeting ASTM B733, wherein the nickel phosphate coating includes about 5 percent to 9 percent phosphate and has a coating thickness of 5 to 10 micrometer. The sample busbar constructed according to one or more embodiments of the present invention has a copper substrate meeting C11000-HO60, with a thickness of 800 plus/minus 20 micrometers, having an electroplated nickel coating meeting ASTM B689, wherein the nickel coating has no intentionally added hardener or brightener and the coating is provided with a matte finish, with a coating thickness of 0.5 to 1.5 micrometers. For the purpose of comparing certain electrochemical properties of these two busbars, the comparative busbar is termed "comparative busbar" and the other busbar is termed "sample busbar."

As can be viewed from Table 1, and relative to the comparative busbar, the sample busbar has about 10 times more conductivity, is 2 times softer in copper substrate, 6 times softener in the coating, 4 times more formable in the copper substrate and 10 times more formable in the coating. In addition, and relative to the baseline busbar, the sample busbar present less springback effect, has more solderability partly due to the non-inclusion of phosphate in the coating, greater weldability. Moreover, and because electroplating is usually less costly than electroless plating, the sample busbar may be produced with greater cost efficiency relative to the baseline busbar.

EXAMPLES

Table 2 lists the mechanical, thermal, metallurgical and electrical properties of the battery cell terminals and interconnector board busbars according to one or more embodiments of the present invention, in comparison to conventional constructions.

TABLE 2

Physical Properties of Battery Cell Terminals and ICB Busbars.

| | Battery Cell Terminals | | | Comparative Busbar | | Sample Busbar | |
|---|---|---|---|---|---|---|---|
| | Al (+)* | Cu (−)* | Ni (−) | Cu | NiP, Ni$_3$P | Cu* | Ni |
| Thickness (μm) | 200 | 200 | 1.0 +/− 0.5 | 800 | >5 | 800 +/− 20 | 1.0 +/− 0.5 |
| TS (MPa) | 77 | 240 | 345-485 | 245 | >700 | 239 | 345-485 |
| TE (%) | 18 | 46 | 10-30 | 10 | 1-1.5 | 41 | 10-30 |
| Hardness (HV0.1)** | 15 HV | <70 HV | 130-200 | 90 HV | 1100 | ~45 HV | 130-200 |
| Density - Solid (kg/m$^3$) | 2700 | 8950 | 8750 | 8890 | 8167 | 8890 | 8750 |
| Thermal Conductivity - Solid (W/m · K) | 238 | 397 | 88.5 | 388 | 8 | 388 | 88.5 |
| Thermal Capacity - Solid (J/kg · K) | 917 | 386 | 452 | 385 | | 385 | 452 |
| Melting Temperature, T$_m$ (° C.) | 660 | 1083 | 1455 | 1083 | 890 | 1083 | 1455 |
| Latent Heat of Fusion (kJ/kg) | 388 | 205 | 292 | 205 | | 205 | 292 |
| Density - Liquid at T$_m$ (kg/m$^3$) | 2385 | 8000 | 7905 | 8000 | | 8000 | 7905 |
| Thermal Conductivity - Liquid (W/m · K) | 100 | 165 | 30 | 165 | | 165 | 30 |
| Thermal Capacity - Liquid (J/kg · K) | 1178 | 490 | 652 | 490 | | 490 | 652 |
| Coefficient of Thermal Expansion ($10^{-6}$ K$^{-1}$) | 25.5 | 17.7 | 17 | 17.7 | 13 | 17.7 | 17 |

TABLE 2-continued

Physical Properties of Battery Cell Terminals and ICB Busbars.

| | Battery Cell Terminals | | | Comparative Busbar | | Sample Busbar | |
|---|---|---|---|---|---|---|---|
| | Al (+)* | Cu (−)* | Ni (−) | Cu | NiP, Ni$_3$P | Cu* | Ni |
| Surface Tension - Liquid at T$_m$ (N/m) | 0.914 | 1.285 | 1.778 | 1.285 | | 1.285 | 1.778 |
| Self-Diffusivity in Liquid at T$_m$ ($10^{-9}$ m$^2$/s) | 4.87 | 3.97 | 3.90 | 3.97 | | 3.97 | 3.90 |
| Effective Molecular Diameter - Liquid at T$_m$ ($10^{-10}$ m) | 2.66 | 2.37 | 2.32 | 2.37 | | 2.37 | 2.32 |
| Viscosity - Liquid at T$_m$ (mN · s/m$^2$) | 1.250 | 4.502 | 5.464 | 4.502 | | 4.502 | 5.464 |
| Electrical Conductivity (% IACS)*** | 65 | 101 | 29 | 100 | 3 | 100.7 | 29 |
| Electrical Conductivity (MegaS/m) | 37.67 | 58.69 | 14.30 | 58.11 | 1.74 | 58.41 | 14.30 |
| Electrical Resistivity (μΩ · cm) | 2.65 | 1.71 | 6.05 | 1.72 | 68 | 1.71 | 6.05 |

*Mechanical properties are measured, and the rest of properties are from theoretical calculations or publication.
**Hardness data is for comparison only. The actual hardness is dependent on the heat treatment & is specified based on application.
***172.41/Resistivity = % IACS; 100% IACS = 58 MegaS/m.

While the best mode for carrying out the invention has been described in detail, those familiar with the art to which this invention relates will recognize various alternative designs and embodiments for practicing the invention as defined by the following claims.

What is claimed is:

1. A method comprising:
   electroplating a nickel outer layer onto a base layer;
   forming a busbar from the base layer and nickel outer layer to obtain a busbar nickel outer layer contacting a busbar base layer; and
   joining the busbar to a battery cell terminal such that the busbar nickel outer layer contacts the battery cell terminal;
   wherein the nickel outer layer does not include a significant amount of any element other than nickel.

2. The method of claim 1, wherein the forming the busbar includes forming an inner region of the busbar for receiving the battery cell terminal and an opposing outer region, wherein the busbar nickel outer layer is at least partially located within the inner region.

3. The method of claim 1, wherein the forming is subsequent to the electroplating.

4. The method of claim 1, wherein the nickel outer layer includes less than 5 percent weight of phosphorus.

5. The method of claim 1, wherein the busbar nickel outer layer has a thickness of 0.5 to 1.5 micrometers.

6. The method of claim 1, wherein the base layer is aluminum.

7. A method comprising:
   electroplating a nickel outer layer onto a base layer of a busbar to form a busbar nickel outer layer contacting a busbar base layer; and
   joining the busbar to a battery cell terminal such that the busbar nickel outer layer contacts the battery cell terminal;
   wherein the nickel outer layer does not include a significant amount of any element other than nickel.

8. The method of claim 7, further comprising forming the busbar to include an inner region of the busbar for receiving the battery cell terminal and an opposing outer region, wherein the busbar nickel outer layer is at least partially located within the inner region.

9. The method of claim 7, wherein the nickel outer layer includes less than 5 percent weight of phosphorus.

10. The method of claim 7, wherein the busbar nickel outer layer has a thickness of 0.5 to 1.5 micrometers.

11. The method of claim 7, further comprising forming the busbar to include a rectangular "U" shape having a base and at least two walls extending from the base at an angle between 65 to 115 degrees.

12. A method comprising:
    electroplating a nickel outer layer onto an aluminum base layer;
    forming a busbar from the aluminum base layer and nickel outer layer to obtain a busbar nickel outer layer contacting a busbar aluminum base layer; and
    joining the busbar to a battery cell terminal such that the busbar nickel outer layer contacts the battery cell terminal;
    wherein the nickel outer layer does not include a significant amount of any element other than nickel.

13. The method of claim 12, wherein the forming the busbar includes forming an inner region of the busbar for receiving the battery cell terminal and an opposing outer region, wherein the busbar nickel outer layer is at least partially located within the inner region.

14. The method of claim 12, wherein the forming is subsequent to the electroplating.

15. The method of claim 12, wherein the nickel outer layer includes less than 5 percent weight of phosphorus.

16. The method of claim 12, wherein the nickel outer layer includes less than 0.01 percent weight of a hardener.

17. The method of claim 12, wherein the busbar nickel outer layer has a thickness of 0.5 to 1.5 micrometers.

* * * * *